No. 642,577. Patented Feb. 6, 1900.
W. O. BOYKIN.
WRENCH.
(Application filed Nov. 13, 1899.)
(No Model.)
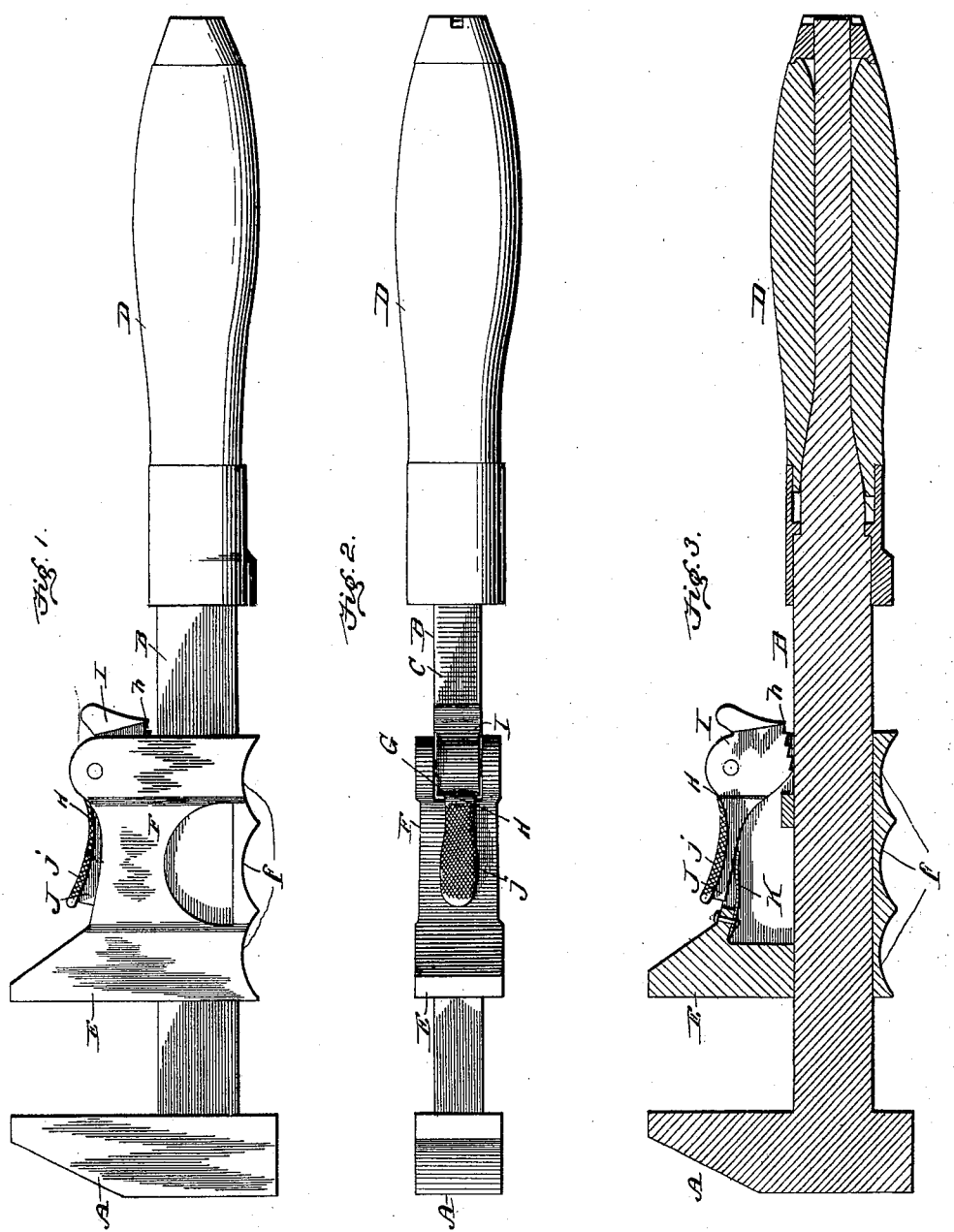
Witnesses
Edwin B. H. Tower, Jr.
Herbert D. Lawson.
Inventor
Willis O. Boykin,
By Edson Bros,
Attorneys

UNITED STATES PATENT OFFICE.

WILLIS OSGOOD BOYKIN, OF JACKSON, TENNESSEE.

WRENCH.

SPECIFICATION forming part of Letters Patent No. 642,577, dated February 6, 1900.

Application filed November 13, 1899. Serial No. 736,812. (No model.)

*To all whom it may concern:*

Be it known that I, WILLIS OSGOOD BOYKIN, a citizen of the United States, residing at Jackson, in the county of Madison and State of Tennessee, have invented certain new and useful Improvements in Wrenches; and I do hereby declare the following to be a full, clear, and exact description of the invention, such as will enable others skilled in the art to which it appertains to make and use the same.

This invention relates to new and useful improvements in wrenches; and its object, among other things, is to provide means of peculiar construction whereby the sliding jaw may be quickly adjusted and firmly locked in position.

To these ends the invention consists in the novel construction and combination of parts hereinafter more fully described and claimed, and illustrated in the accompanying drawings, showing the preferred form of my invention, and in which—

Figure 1 is a side elevation of the device. Fig. 2 is a top plan view thereof. Fig. 3 is a central longitudinal section through the wrench, showing the dog in elevation.

Referring to said figures by letters of reference, A is the fixed or stationary jaw, having a shank B secured at one end to a suitable handle D.

Slidably mounted upon and inclosing the shank B is a jaw E, having a rearwardly-extending portion F, likewise inclosing the shank, and its under surface is concaved transversely, as shown at *f*, for the purpose hereinafter described.

Pivoted within a slot G, formed within the upper surface of the portion F, is a dog H, having transversely-extending teeth or serrations *h* formed upon the lower surface of the head I thereof. Projecting forward from said head and toward the jaw E is a stem J, flattened and spread at its upwardly-turned end *j* and bearing upon a bow-spring K, riveted to the under surface of the jaw E, as shown. The rear portion of the head I is so formed as to provide a thumb-piece L.

In operation it is obvious that the teeth on the dog will normally engage with the shank B by reason of the upward pressure exerted upon the stem J by spring K.

When it is desired to adjust the jaw E forward, it is merely necessary to slide the same along the shank. Said dog will not, however, permit any backward motion of the jaw E unless disengaged from the shank. To disengage the two, it is merely necessary to press down upon the flattened end of the stem J. This will depress the spring K and raise the head I of the dog H. The jaw can then be slid back the desired distance. It is obvious that the flattened portion of the end *j* will limit the downward movement of the stem of the dog. By providing the concaved grooves *f* within the portion F said portion may be readily grasped by the hand when operating the dog, the fingers fitting comfortably within the grooves.

It will be seen that by the above construction I am enabled to form an adjustable sliding jaw of the minimum number of parts without sacrificing its strength, effectiveness, or ease in operation.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim, and desire to secure by Letters Patent, is—

1. In a wrench, the combination, with a stationary jaw and shank, of a sliding jaw and a rearwardly-extending portion thereto, both having a longitudinal passage therein for the reception of said shank, and a slot communicating with said passage, a dog pivoted within the slot, teeth therein for engagement with the surface of the shank, a T-shaped stem, a thumb-piece at opposite sides of the pivot of the dog, and a spring secured to the jaw within the slot and bearing upon the under surface of the stem, for the purpose and substantially as described.

2. In a wrench, the combination, with a stationary jaw and shank, of a sliding jaw and a rearwardly-extending portion thereto, both having a longitudinal passage therein for the reception of said shank, and a slot communicating with said passage, a dog pivoted within the slot, teeth therein for engagement with the surface of the shank, a T-shaped stem, a thumb-piece at opposite sides of the pivot of the dog, a spring secured to the jaw within the slot and bearing upon the under surface of the stem, and transversely-extending ridges upon the under surface of the sliding jaw forming finger-receiving concavities, substantially as described.

In testimony whereof I affix my signature in presence of two witnesses.

WILLIS OSGOOD BOYKIN.

Witnesses:
JOHN MAGEVNEY,
C. A. CHANDLER.